United States Patent
Gopukumar et al.

(10) Patent No.: US 9,882,206 B2
(45) Date of Patent: Jan. 30, 2018

(54) CATHODE MATERIAL AND LITHIUM ION BATTERY THEREFROM

(75) Inventors: Sukumaran Gopukumar, Karaikudi (IN); Chandrasekaran Nithya, Karaikudi (IN); Ramasamy Thirunakaran, Karaikudi (IN); Arumugam Sivashanmugam, Karaikudi (IN); Sundeep Kumar Dhawan, New Rajender Nagar (IN); Rakesh Behari Mathur, New Rajender Nagar (IN); Priyanka Heda Maheshwari, New Rajender Nagar (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 506 days.

(21) Appl. No.: 13/880,306

(22) PCT Filed: Mar. 29, 2011

(86) PCT No.: PCT/IB2011/000662
§ 371 (c)(1),
(2), (4) Date: Dec. 9, 2013

(87) PCT Pub. No.: WO2012/052810
PCT Pub. Date: Apr. 26, 2012

(65) Prior Publication Data
US 2014/0087257 A1    Mar. 27, 2014

(30) Foreign Application Priority Data
Oct. 20, 2010  (IN) .......................... 2494/DEL/2010

(51) Int. Cl.
*H01M 10/0525* (2010.01)
*H01M 4/36* (2006.01)
(Continued)

(52) U.S. Cl.
CPC ............ *H01M 4/366* (2013.01); *C01D 15/02* (2013.01); *H01M 4/1391* (2013.01);
(Continued)

(58) Field of Classification Search
CPC .......................... H01M 4/131; H01M 10/0525
See application file for complete search history.

(56) References Cited

U.S. PATENT DOCUMENTS 6,503,660 B2    1/2003 Baker et al.
6,613,479 B2    9/2003 Fukuzawa et al.
(Continued)

OTHER PUBLICATIONS

International Search Report dated Aug. 31, 2011 (PCT/IB2011/000662); ISA/EP.
(Continued)

*Primary Examiner* — Olatunji Godo
(74) *Attorney, Agent, or Firm* — Banner & Witcoff, Ltd.

(57) ABSTRACT

A new high performing lithium ion cell having new carbon based anode and new dual doped layered cathode materials. The anode is a self standing carbon fibrous material and the cathode is a dual doped Lithium cobalt oxide of general formula $LiM_xN_yCo_{1-x-y}O_2$ (0.01≤x, y≤0.2) wherein M is a divalent alkaline earth metal cation and N is a divalent transition metal cation. Lithium ion cells of 2016 coin cells were assembled using the above materials deliver specific capacity of 60-85 mAhg$^{-1}$ at 1 C rate and exhibit excellent cycling stability of 90-95% even after 200 cycles when cycled between 2.9-4.1V.

23 Claims, 3 Drawing Sheets

(51) Int. Cl.
  *H01M 4/1391* (2010.01)
  *H01M 4/485* (2010.01)
  *H01M 4/525* (2010.01)
  *H01M 4/587* (2010.01)
  *C01D 15/02* (2006.01)

(52) U.S. Cl.
  CPC ........... *H01M 4/485* (2013.01); *H01M 4/525* (2013.01); *H01M 4/587* (2013.01); *H01M 10/0525* (2013.01)

(56) References Cited

U.S. PATENT DOCUMENTS

| | | | |
|---|---|---|---|
| 7,285,358 B2 | 10/2007 | Park et al. | |
| 7,704,637 B2 | 4/2010 | Yan et al. | |
| 7,736,809 B2 | 6/2010 | Hwang et al. | |
| 2002/0014222 A1 | 2/2002 | Ishikawa | |
| 2002/0061444 A1* | 5/2002 | Kweon | H01M 4/131 429/231.1 |
| 2003/0049534 A1* | 3/2003 | Maeda | B82Y 30/00 429/231.6 |
| 2004/0091780 A1 | 5/2004 | Kinoshita et al. | |
| 2006/0078797 A1 | 4/2006 | Munshi | |
| 2007/0224506 A1* | 9/2007 | Ooyama | C01G 23/04 429/231.3 |
| 2008/0008928 A1* | 1/2008 | Partin | H01M 2/0285 429/61 |
| 2009/0117467 A1 | 5/2009 | Zhamu et al. | |
| 2010/0282496 A1* | 11/2010 | Landi | H01G 9/058 174/133 R |

OTHER PUBLICATIONS

R. Vasanthi. I. Ruthmangani. S. Selladurai: "Synthesis and characterization of non-stoichiometric compound $LiCo1-x-yMg_xAl_yO_2$ ($0.03<x$ and $y<0.07$) for lithium battery application", Inorganic Chemistry Communications, vol. 6. 2003. pp. 953-957, XP000002657127, abstract.

C. N. Zaheena, C. Nithya, R. Thirunakaran, A. Sivashanmugam, S. Gopukumar: "Microwave assisted synthesis and electrochemical behaviour of $LiMg0.1Co0.9O2$ for lithium rechargeable batteries", Electrochim. Acta. vol. 54. No. 10. 2009. pp. 2877-2882, XP000002657128.

W. Luo, F. Zhou, X. Zhao. Z. Lu, X. Li, J. R. Dahn: "Synthesis, characterization and thermal stability of $LiNi1/3Mn1/3CO1/3-zMg_zO2.LiNi1/3-zMn1/3Co1/3Mg_zO2$, $LiNi1/3Mn1/3-zCo1/3Mg_zO2$", Chem. Mater., vol. 22, Oct. 12, 2009 (Oct. 12, 2009), pp. 1164-1172. XP000002657129, online.

P. Y. Liao, J. G. Duh, H. S. Sheu, J. Power: "Structural and thermal properties of $LiNi0.6-xMg_xCo0.25Mn0.15O2$ cathode materials", Journel of Power Sources, vol. 183, 2008, pp. 766-770, XP000002657130.

Mizushima, P.C. Jones, P.J. Wiseman, J.B. Goodenough. A new cathode material for batteries of high energy density—K. Mater. Res. Bull. 15 (1980) 783.

L. Liu, Z. Wang, H. Li, L. Chen, X. Huang. $Al_2O_3$ coated $LiCoO_2$ as cathode material for lithium ion batteries—Solid-State Ionics 152-153 (2002) 341-346.

Cho, Y. J. Kim, B. Park. Novel $LiCoO_2$ cathode material with $Al_2O_3$ coating for lithium ion cell—J. Chem. Mater. 12 (2000) 3788.

J. Cho, Y. J. Kim, B. Park. Zero strain intercalation cathode for rechargeable Li-Ion cell—Angew. Chem., Int. Ed. 40 (2001) 3367.

S. Gopukumar, Yonghyun Jeong, Kwang Bum Kim. Synthesis and electrochemical performance of tetravalent doped $LiCoO_2$ in lithium rechargeable batteries—Solid-State Ionics 159 (2003) 223-232.

Meijing Zou, Masaki Yoshio, S. Gopukumar, and Jun-ichi Yamaki. Performance of $LiM0.05Co0.95O_2$ cathode materials in lithium rechargeable cells when cycled upto 4.5V—Chem. Mater. 17 (2005) 1284.

S. Levasseur, M. Menetrier, C. Delmas. On the $Li_xCo1-yMg_yO_2$ system upon deintercalation; electrochemical, electronic properties and Li MAS NMR studies—J Power Sources 112 (2) (2002) 419-427.

Ramdas B. Khomane, Amit C. Agrawal, B.D. Kulkarni, S. Gopukumar, A. Sivashanmugam. Preparation and electrochemical characterization of lithium cobalt oxide nano particles by modified sol-gel method. Mater. Res. Bull. 43 (2008) 2494.

S. Castro-Garcia, A. Castro-Coucerio, M.A. Senaris-Rodriguez, F. Soulette, C. Julien. Influence of Aluminium doping on the properties of $LiCoO_2$ and $LiNi0.5Co0.5O_2$ oxides. Solid-State Ionics 156 (2003) 15-26.

S. Deepa, N. S. Arvindan, C. Sugadev, R. Tamilselvi, M. Sakthivel, A. Sivashanmugam, S. Gopukumar. Synthesis and electrochemical behaviour of copper doped manganate and cobaltate cathode material for lithium batteries—Bull. Electrochem. 15 (1999) 381-384.

Meijing Zou, Masaki Yoshio, S. Gopukumar, Jun-ichi Yamaki. Synthesis of High-voltage (4.5V) cycling doped $LiCoO_2$ for use in lithium rechargeable cells—Chem. Mater. 15 (15) (2003) 4699-4702.

P. Ghosh, S. Mahanty, R. N. Basu. La doped $LiCoO_2$ with high rate capability—Electrochim. Acta 54 (2009) 1654.

S.M. Lala, L.A. Montoro, V. Lemos, M. Abbate, J.M. Rosolen. The negative and positive structural effects of Ga doping in the electrochemical performance of $LiCoO_2$—Electrochim. Acta 51 (2005) 7-13.

Xiaoling Ma, Chiwei Wang, Jinguo Cheng, Jutang Sun. Effects of Sn doping on the structural and electrochemical properties of $LiNi0.8Co0.2O_2$ cathode materials—Solid State Ionics 178 (2007) 125.

P. Elumalai, H.N. Vasan, N. Munichandraiah. Microwave synthesis and electrochemical properties of $LiCo1-xM_xO_2$ (M = Al and Mg) cathodes for Li-ion rechargeable batteries—J. Power Sources 125 (2004) 77.

* cited by examiner

CATHODE MATERIAL AND LITHIUM ION BATTERY THEREFROM

CROSS-REFERENCE TO RELATED APPLICATIONS

The present application is a U.S. National Phase filing of International Application No. PCT/IB2011/000662, filed on Mar. 29, 2011, designating the United States of America and claiming priority to India Patent Application No. 2494/DEL/2010, filed Oct. 20, 2010, and this application claims priority to and the benefit of all the above-identified applications, which are incorporated by reference herein in their entireties.

FIELD OF THE INVENTION

The present invention relates to a high voltage, high performance layered cathode material $LiM_xN_yCo_{1-x-y}O_2$, wherein x and y are positive values (0.01≤x, y≤0.2), M and N are dopants and M is divalent alkaline earth metal cation and N is divalent transition metal cation, based on currently used lithium cobalt oxide materials synthesized by microwave method for lithium rechargeable batteries.

The present invention further relates to a cathode material $LiM_xN_yCo_{1-x-y}O_2$ synthesized by microwave heating method for lithium secondary batteries.

Present invention also relates to lithium ion battery comprising aforesaid cathode material and a high performing carbon paper anode material (i.e. micro fiber textured carbon sheets) as a source of power for LED lightening.

BACKGROUND OF THE INVENTION

In 1991, Sony announced new class of lithium secondary batteries, called lithium-ion batteries, which strongly impacted the battery community all over the world because of their high operating voltage. It consists of two lithium intercalation materials, one for the negative electrode and the other for the positive electrode in an electrochemical cell. Combination of the two lithium insertion materials performs the basic function of lithium-ion batteries. The development of lithium-ion rechargeable batteries of high energy density relies on the successful development of high energy density intercalation electrode materials.

References may be made to patent "US 2006/0078797" wherein the use of graphite anode and $Li_8V_6O_{13}$ cathode which gives the energy density of 140-280 Wh/kg.

U.S. Pat. No. 7,736,809 B2 discloses the layer-by-layer assembly of the cathode active a material on the current collector and the anode is the lithium deposited copper which provides the energy density of 140-180 Wh/kg.

References may be made to patent "U.S. Pat. No. 7,104,637 B2" wherein the lithium ion battery delivers the capacity retention of 70-75% after 500 cycles which uses the conventional active materials for anode and cathode, the separator is the porous elastomer.

Carbon based anode materials, primarily petroleum coke has been considered as intercalating anode material with 372 mAh/g as specific capacity. In the present day lithium ion batteries carbon is normally coated on to a copper foil current collector. This material delivers only 150-170 mAh/g in a practical cell.

References may be made to patent "U.S. Pat. No. 7,285,358 B2" wherein the carbon source comprises an amorphous carbon or a crystalline carbon which has a thickness ranging from 1 to about 300 nm and produces good electrochemical performance.

References may be made to patent "US 2009/0117467 A1" wherein a nano-scaled graphene platelet-based composite material, which exhibits an exceptional specific capacity, an excellent reversible capacity and a long cycle-life has been disclosed.

References may be made to patent "U.S. Pat. No. 6,503,660 B2" wherein crystalline graphitic carbon nano fibers composed of graphite sheets provides highest discharge capacity and cycling stability has been disclosed. However, all the above graphite based anode materials exhibit large amount of irreversible capacity.

Lithiated transition metal oxides, namely $LiCoO_2$, $LiMn_2O_4$ and $LiNiO_2$ are primarily considered as cathode materials for lithium ion batteries. $LiNiO_2$ possess safety problem during charging, causes difficulties such as excessive evolution of gas, build-up of cell resistance, decomposition of electrolyte etc. $LiMn_2O_4$ is one of the eco-friendly cathode materials that possess many advantages such as low cost, safety, price and low toxicity. The main disadvantage is structural instability. Because of the above problems researchers mainly focused to improve the performance of the $LiCoO_2$ cathode materials. $LiCoO_2$ cathode material, first introduced by Mizushima et al "$Li_xCoO_2$ (0<x<1): A new cathode material for batteries of high energy density-K. Mizushima, P. C. Jones, P. J. Wiseman, J. B. Goodenough, *Mater. Res. Bull.* 15 (1980) 783" in 1980's, with a layer structure is used as the preferred cathode material in majority of the commercial lithium ion cells in view of its ease of synthesis and high reversibility though active studies are also being made towards its improvement.

As charge and discharge takes place, the valence number of Co in $LiCoO_2$ changes as follows:

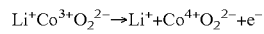

As apparent from this formula, $LiCoO_2$ contains trivalent Co and brings about discharging as the trivalent Co is changed to tetravalent Co. Substituting another element, which has small size, compared to $Co^{3+}$ ion leads to contraction along the c-axis results in mechanical failure of the $LiCoO_2$ particles and rapid capacity fading "$Al_2O_3$ coated $LiCoO_2$ as cathode material for lithium ion batteries—L. Liu, Z. Wang, H. Li, L. Chen, X. Huang, *Solid-State Ionics* 152-153 (2002) 341-346". Therefore difficult to acquire a highly reliable positive active material with high discharge capacity and low capacity fade.

Cho et al "Novel $LiCoO_2$ cathode material with $Al_2O_3$ coating for lithium ion cell-J. Cho, Y. J. Kim, B. Park, *Chem. Mater.* 12 (2000) 3788" and "Zero strain intercalation cathode for rechargeable Li-Ion cell—J. Cho, Y. J. Kim, B. Park, *Angew. Chem., Int. Ed.* 40 (2001) 3367" and many other researchers achieved the reversible capacity at high voltages through coating with inactive metal oxides thereby providing good structural stability during cycling. Another approach is to improve the structural stability as well as cycling stability of the $LiCoO_2$ materials through doping with transition metals cations and non-transition metal cations "Synthesis and electrochemical performance of tetravalent doped $LiCoO_2$ in lithium rechargeable batteries—S. Gopukumar, Yonghyun Jeong, Kwang Bum Kim, *Solid-State Ionics* 159 (2003) 223-232", "Performance of $LiM_{0.05}Co_{0.95}O_2$ cathode materials in lithium rechargeable cells when cycled up to 4.5V—Meijing Zou, Masaki Yoshio, S. Gopukumar, and Jun-ichi Yamaki, *Chem. Mater.* 17 (2005) 1284", "Microwave assisted synthesis and electrochemical behaviour of LiMg$_{0.1}$Co$_{0.9}$O$_2$ for lithium rechargeable batteries—C. N. Zaheena, C. Nithya, R. Thirunakaran, A. Sivashanmugam, S. Gopukumar, *Electrochim. Acta* 54 (10) (2009) 2877-2882", "On the Li$_x$Co$_{1-y}$Mg$_y$O$_2$ system upon deintercalation; electrochemical, electronic properties and $^7$Li MAS NMR studies—S. Levasseur, M. Menetrier, C. Delmas, *J. Power Sources* 112 (2) (2002) 419-427", "Preparation and electrochemical characterization of lithium cobalt oxide nano particles by modified sol-gel method—Ramdas B. Khomane, Amit C. Agrawal, B. D. Kulkarni, S. Gopukumar, A. Sivashanmugam, *Mater. Res. Bull.* 43 (2008) 2494" and "Influence of Aluminium doping on the properties of LiCoO$_2$ and LiNi$_{0.5}$Co$_{0.5}$O$_2$ oxides—S. Castro-Garcia, A. Castro-Coucerio, M. A. Senaris-Rodriguez, F. Soulette, C. Julien, *Solid-State Ionics* 156 (2003) 15-26". Many patents and publications have suggested this coating approaches but this improvement to commercial batteries did not sufficiently solve the high voltage and elevated temperature problems. H. Y. Xu et al "Microwave assisted synthesis and electrochemical behaviour of LiMg$_{0.1}$Co$_{0.9}$O$_2$ for lithium rechargeable batteries—C. N. Zaheena, C. Nithya, R. Thirunakaran, A. Sivashanmugam, S. Gopukumar, *Electrochim. Acta* 54 (10) (2009) 2877-2882", W. Luo et al "Synthesis, characterization and thermal stability of LiNi$_{1/3}$Mn$_{1/3}$Co$_{1/3-z}$Mg$_z$O$_2$, LiNi$_{1/3-z}$Mn$_{1/3}$Co$_{1/3}$Mg$_z$O$_2$, LiNi$_{1/3}$Mn$_{1/3-z}$Co$_{1/3}$Mg$_z$O$_2$—W. Luo, F. Zhou, X. Zhao, Z. Lu, X. Li, J. R. Dahn, *Chem. Mater.* 22 (2010) 1164" and R. Vasanthi et al "Synthesis and characterization of non-stoichiometric compound LiCo$_{1-x-y}$Mg$_x$Al$_y$O$_2$ (0.03≤x and y≤0.07) for lithium battery application—R. Vasanthi, I. Ruthmangani, S. Selladurai, *Inorg. Chem. Commun.* 6 (2003) 953" reported that Mg is one of the effective dopant, which increases structural stability during cycling due to the pillaring effect. However, upper cut-off voltage increases >4.3 V Vs Li/Li$^+$, capacity gradually decreases due to the non-suitable co-dopant. Deepa et al "Synthesis and electrochemical behaviour of copper doped manganate and cobaltate cathode material for lithium batteries—S. Deepa, N. S. Arvindan, C. Sugadev, R. Tamilselvi, M. Sakthivel, A. Sivashanmugam, S. Gopukumar, *Bull. Electrochem.* 15 (1999) 381-384" and M. Zou et al "Synthesis of High-voltage (4.5V) cycling doped LiCoO$_2$ for use in lithium rechargeable cells—Meijing Zou, Masaki Yoshio, S. Gopukumar, Jun-ichi Yamaki, *Chem. Mater.* 15 (15) (2003) 4699-4702" investigated Cu as one of the effective dopant to increase the cycling stability at high voltages.

The present day lithium ion batteries are normally charged up to 4.2V and provide the discharge capacity of 130-140 mAhg$^{-1}$. Increasing the charging voltage of lithium cobalt oxide based batteries to 4.3, 4.4 and 4.5 V Vs Li/Li$^+$ will significantly increase the reversible capacity to 160, 170 and 190 mAhg$^{-1}$. Cho et al "Novel LiCoO$_2$ cathode material with Al$_2$O$_3$ coating for lithium ion cell-J. Cho, Y. J. Kim, B. Park, *Chem. Mater.* 12 (2000) 3788" achieved this reversible capacity at high voltages through coating with inactive metal oxides thereby providing good structural stability during cycling.

However, coating approaches did not sufficiently solve the high voltage and elevated temperature problems to commercial batteries. In order to overcome these problems, elemental substitution is one of the best approaches to achieve the highest reversible capacity. Many researchers "The negative and positive structural effects of Ga doping in the electrochemical performance of LiCoO$_2$—S. M. Lala, L. A. Montoro, V. Lemos, M. Abbate, J. M. Rosolen, *Electrochim. Acta* 51 (2005) 7-13", "Synthesis and electrochemical performance of tetravalent doped LiCoO$_2$ in lithium rechargeable batteries-S. Gopukumar, Yonghyun Jeong, Kwang Bum Kim, *Solid-State Ionics* 159 (2003) 223-232", "Structural and thermal properties of LiNi$_{0.6-x}$Mg$_x$Co$_{0.25}$Mn$_{0.15}$O$_2$ cathode materials—P. Y. Liao, J. G. Duh, H. S. Sheu, *J. Power Sources* 183 (2008) 766", "Microwave synthesis and electrochemical properties of LiCo$_{1-x}$M$_x$O$_2$ (M=Al and Mg) cathodes for Li-ion rechargeable batteries—P. Elumalai, H. N. Vasan, N. Munichandraiah, *J. Power Sources* 125 (2004) 77, Effects of Sn doping on the structural and electrochemical properties of LiNi$_{0.8}$Co$_{0.2}$O$_2$ cathode materials-Xiaoling Ma, Chiwei Wang, Jinguo Cheng, Jutang Sun, *Solid State Ionics* 178 (2007) 125" and "La doped LiCoO$_2$ with high rate capability—P. Ghosh, S. Mahanty, R. N. Basu, *Electrochim. Acta* 54 (2009) 1654" investigated doping metal cations such as Ti, Zr, Mg, Ni, Al, Sn, Ga and rare earth metal ions such as La etc. References may be made to patent US 2004-91780 A1, wherein addition of LiF and LiOH to mixed hydroxides prior to a solid state reaction is disclosed. The present invention discloses a new material with high capacity and better cyclability by adopting mixed dopent approach involving specific cation combination.

References may be made to patent "US 2002-14222 A1" wherein doping of halogens to high crystalline LiCoO$_2$. However, these halogens do not act as good dopant because the addition of LiF initially increases capacity but gradually decreases has been disclosed. Addition of MgF$_2$ might be suitable for spinel or Li—Ni—Mn—Co based materials, but it is not recommended for LiCoO$_2$. U.S. Pat. No. 6,613,479 discloses the fluorine doping to LiMnO$_2$ material, however, the material are to be prepared in inert gas at low temperature and also it has poor crystallinity.

Due to the many problems in the above approaches, mixed dopant approach is found to be the best method, which provides better cycling performance as suggested by few researchers "Synthesis, characterization and thermal stability of LiNi$_{1/3}$Mn$_{1/3}$Co$_{1/3-z}$Mg$_z$O$_2$, LiNi$_{1/3-z}$Mn$_{1/3}$Co$_{1/3}$Mg$_z$O$_2$, LiNi$_{1/3}$Mn$_{1/3-z}$Co$_{1/3}$Mg$_z$O$_2$—W. Luo, F. Zhou, X. Zhao, Z. Lu, X. Li, J. R. Dahn, *Chem. Mater.* 22 (2010) 1164", "Synthesis and characterization of non-stoichiometric compound LiCo$_{1-x-y}$Mg$_x$Al$_y$O$_2$ (0.03≤x and y≤0.07) for lithium battery application—R. Vasanthi, I. Ruthmangani, S. Selladurai, *Inorg. Chem. Commun.* 6 (2003) 953" and "Effects of Sn doping on the structural and electrochemical properties of LiNi$_{0.8}$Co$_{0.2}$O$_2$ cathode materials—Xiaoling Ma, Chiwei Wang, Jinguo Cheng, Jutang Sun, *Solid State Ionics* 178 (2007) 125".

Mg has been reported to be one of the effective dopant, which increases structural stability during cycling due to the pillaring effect. However, cut-off voltage above 4.3 V Vs Li/Li$^+$, decreases the capacity gradually due to the non-compatible co-dopants. Deepa et al "Synthesis and electrochemical behaviour of copper doped manganate and cobaltate cathode material for lithium batteries—S. Deepa, N. S. Arvindan, C. Sugadev, R. Tamilselvi, M. Sakthivel, A. Sivashanmugam, S. Gopukumar, *Bull. Electrochem.* 15 (1999) 381-384" and M. Zou et al "Performance of LiM$_{0.05}$Co$_{0.95}$O$_2$ cathode materials in lithium rechargeable cells when cycled up to 4.5V—Meijing Zou, Masaki Yoshio, S. Gopukumar, and Jun-ichi Yamaki, *Chem. Mater.* 17 (2005) 1284" investigated Cu as one of the effective dopant to increase the cycling stability at high voltages.

OBJECTIVE OF THE INVENTION

Main objective of the present invention is to provide a high voltage, high performance layered cathode material $LiM_xN_yCo_{1-x-y}O_2$, wherein x and y are positive values (0.01≤x, y≤0.2), M and N are dopants and M is divalent alkaline earth metal cation and N is divalent transition metal cation for lithium ion batteries.

Another objective of the present invention is to provide a cathode material suitable for rechargeable lithium ion battery.

Still another objective of the present invention is to provide a highly ordered lithium cobalt oxide with suitable mixed dopants which offer good structural stability during cycling at high voltages.

Yet another objective of the present invention is to provide a cathode material capable of delivering good/reasonable discharge capacity of 160-230 mAhg$^{-1}$ at 0.2 C rate (C is the total capacity of active material present in the electrode and the capacity is drained at ⅕ h rate i.e., 0.2 h rate) and exhibiting excellent cycling efficiency of 90-95% after 50 cycles when cycled between 2.9-4.6V.

Still another objective of the present invention is to provide a graphitic nature carbon paper anode having microfiber texture.

Yet another objective of the present invention is to provide a self standing carbon paper anode material capable of delivering good/reasonable discharge capacity of 200-240 mAhg$^{-1}$ at 0.2 C rate (C is the total capacity of active material present in the electrode and the capacity is drained at ⅕ h rate i.e., 0.2 h rate) and exhibiting excellent cycling stability of 90-97% even after 100 cycles when cycled between 0.01 to 1.5V and low irreversible capacity of 5-7 mAhg$^{-1}$.

Yet another objective of the present invention is to provide a Lithium Ion Battery assembly combining the aforesaid cathode material and high performing carbon paper anode material and a combatable electrolyte to act as a source of power for LED lighting.

Still another objective of the present invention is to provide a lithium ion battery chargeable both from grid/solar power.

Yet another objective of the present invention is to provide a lithium ion battery of 2016 coin cell configuration capable of delivering discharge capacity of 70-90 mAhg$^{-1}$ at 1 C rate (C is the total capacity of active material present in the electrode and the capacity is drained at 1 h rate) and exhibiting excellent cycling stability of 95-98% even after 200 cycles when cycled between 2.9-4.1V.

SUMMARY OF THE INVENTION

Accordingly, the present invention provides a high voltage, high performance layered cathode material of dual doped Lithium cobalt oxide of the formula $LiM_xN_yCo_{1-x-y}O_2$ wherein x and y are positive values (0.01≤x, y≤0.2), M and N are dopants and M is divalent alkaline earth metal cation and N is divalent transition metal cation.

In an embodiment of the present invention, divalent alkaline earth metal cation used is magnesium and divalent transition metal cation used is copper.

In yet another embodiment of the present invention, said dopants provides high conductivity, high discharge capacity, structural stability and cycling stability at high voltage up to 4.6V.

In yet another embodiment of the present invention, said cathode material shows high discharge capacity in the range of 160 to 230 mAh/g at 0.2 C rate up to 50 cycles.

In yet another embodiment of the present invention, said cathode material showing capacity retention percentage is in the range of 84.7 to 95.2% at high rates up to 50 cycles.

In yet another embodiment of the present invention, said cathode material exhibit high voltage performance up to 4.6V and low capacity fade up to 0.20 to 0.25 mAhg$^{-1}$ cycle$^{-1}$.

In further embodiment of the present invention, single step process for the preparation of high voltage, high performance layered cathode material by microwave heating method and the said process comprising the steps of:
i. mixing salts of lithium, copper, magnesium and cobalt in the weight ratio ranging between 1:0.6:0.05:3.3 to 1:0.5:0.2:3.3;
ii. dissolving the mixture as obtained in step (i) in water in the ratio ranging between 1:1 to 1.5:2.0 to obtain metal ion solution;
iii. stirring metal ion solution as obtained in step (ii) continuously with the rate of 300 to 450 rpm at temperature in the range of 80-100° C. for period in the range of 2 to 3 hours to obtain concentrated solution;
iv. transferring concentrated solution as obtained in step (iii) to china dish or silica crucible and placed at the centre of a rotating plate of microwave oven;
v. irradiating the solution as obtained in step (iv) with 100% power and 1500-2450 MHz microwave frequency for period in the range of 30 to 40 minutes;
vi. drying irradiated solution as obtained in step (v) in an air oven at temperature in the range of 100 to 120° C. for period in the range of 2-4 hours;
vii. mortar grinding dried solution as obtained in step (vi) for period in the range of 2 to 4 hrs in air to obtain phase pure high voltage, high performance layered cathode material.

In yet another embodiment of the present invention, said process is carried out without involving further calcinations after step vi.

In yet another embodiment of the present invention, Lithium Ion Battery comprising cathode material and anode material wherein cathode material comprising of dual doped Lithium cobalt oxide of the formula $LiM_xN_yCo_{1-x-y}O_2$ wherein x and y are positive values (0.01≤x, y≤0.2) and M and N are dopant and M is divalent alkaline earth metal cation and N is divalent transition metal cation and anode material comprising of carbon paper.

In yet another embodiment of the present invention, carbon paper used is micro fiber textured carbon sheet.

In yet another embodiment of the present invention, said anode material exhibits discharge capacity in the range of 100-140 mAh/g and 200-240 mAh/g at 1 C and 0.2 C rate respectively for first cycle.

In yet another embodiment of the present invention, said anode material exhibits cycling stability in the range of 90-97% at 0.2 and 1 C rates after 100 cycles when cycled between 0.01-1.5V.

In yet another embodiment of the present invention, said anode material provides very low irreversible capacity in the range of <5-7 mAh/g.

In yet another embodiment of the present invention, said lithium ion battery exhibits cycling stability in the range of 95-98% after 200 cycles when cycled between 2.9-4.1V.

In yet another embodiment of the present invention, said lithium ion battery exhibits discharge capacity in the range of 70-90 mAh/g at 1 C rate for first cycle.

In yet another embodiment of the present invention, said battery exhibits reversibility in the range of 95-98% at high rate.

In yet another embodiment of the present invention, said battery exhibits energy output in the range of 140-300 Wh/kg.

In yet another embodiment of the present invention, said battery is useful as a source of power for LED lighting.

In yet another embodiment of the present invention, said battery is chargeable via solar panel and chargeable in an hour and able to serve to light LEDs for an hour.

DETAIL DESCRIPTION OF THE INVENTION

In the present invention a new rechargeable lithium or lithium-ion coin cell (2016) has been developed for commercial applications like toys, powering LED lights etc. The cell includes an anode, a self standing carbon sheet and a dual doped layered cobalt oxide as cathode. The lithium ion battery cell configuration is chargeable with grid/solar power and can light compact LED bulbs. The cell also includes an electrolyte polypropelene soaked separator located between the anode and cathode such that the anode, cathode, and separator are held together to form the electrochemical energy storage device.

In the present invention a self standing carbon sheet is used as anode which obviates the use of a dedicated copper current collector normally used in lithium ion batteries and also eliminates completely the slurry coating procedure which essentially involves a mixing of different ingredients viz., conducting material, binding material and a slurring agent and the coating process thereby enabling large reduction in the cost. Further, the carbon sheet possesses the following physical characteristics:

Thickness: 0.3-0.35 mm
Density: 0.5 g/cc
Electrical resistivity: <0.005 Ωcm
Flexural strength: >40 MPa
Porosity: >70%
Gas permeability: 2.5-3.0 cc/sec This highly porous texture is helpful in holding the electrolyte which is very essential for the ion mobility during charge discharge. Further, the very low resistivity of the materials reduces the internal resistance of the cell thereby exhibiting high current capability.

Figure 1:
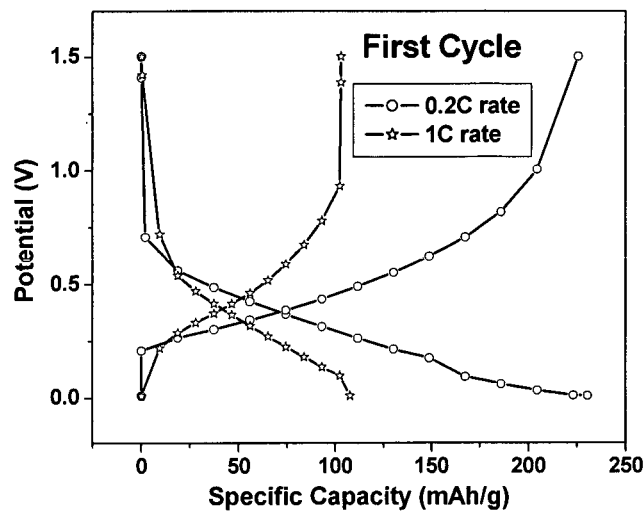
FIG. 1 represents the first charge/discharge curves of carbon sheet (0.3-0.35 mm) at 0.2 and 1 C rate.

FIG. 1 shows the initial discharge curves of carbon paper at 0.2 and 1 C rate when cycled between 0.01-1.5V. Initial discharge capacities of the carbon sheet are around 200-240 and 100-140 mAh/g at 0.2 and 1 C rate respectively. A very low irreversible capacity (<5 mAh/g) is obtained in both the cases. This charge/discharge process is coupled with intercalation and de-intercalation of lithium to in the layers of carbon. Low irreversible capacity is due to the formation of very thin SEI (Solid Electrolyte Interphase) layer, which consumes small amount of $Li^+$ ions.

Figure 2:
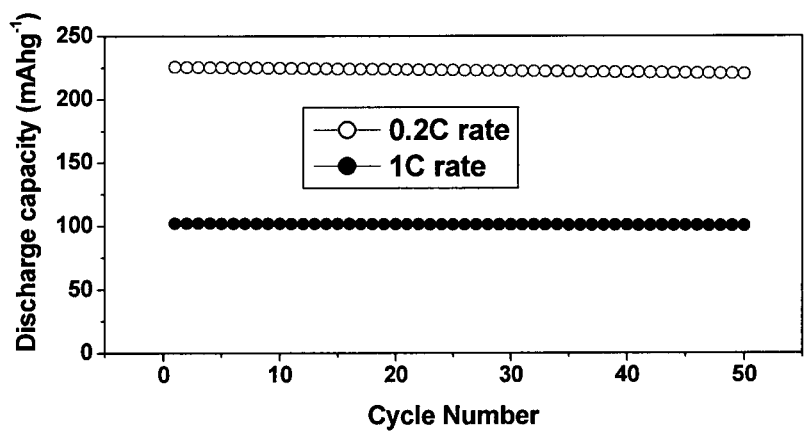
FIG. 2 represents the cycle number Vs discharge capacity curves of carbon sheet at 0.2 and 1 C rate.

FIG. 2 shows the variation of discharge capacity at 0.2 and 1 C rate with the number of cycles when cycled between 0.01-1.5V. At the end of $50^{th}$ cycle, the carbon sheet retains 90-97% at 0.2 and 1 C rates. This excellent cycling stability is achievable due to the thin SEI layer formed in the first cycle which assists further movement of $Li^+$ ions to in the fiber textured carbon. Specific capacity is nothing but discharge capacity per gram of active material.

Present invention provides a high voltage, high performance layered cathode material for lithium ion batteries which comprises lithiated cobalt oxide having space group, R3-m symmetry that includes the divalent cation of copper and magnesium in the transition metal sites. (R3-m is a crystallographic notation for the layered lithium cobalt oxide material)The divalent metal cation provides structural stability and high conductivity to the layered lithium cobalt oxides.

Dual doped Lithium cobalt oxide has the general formula

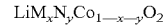

$$LiM_xN_yCo_{1-x-y}O_2$$

wherein x and y are positive values (0.01≤x, y≤0.2)
M is Magnesium (divalent alkaline earth metal cation)
N is Copper (divalent transition metal cation).

The present invention is to improve the structural as well as cycling stability at high voltages suggest the addition of divalent transition metal cation Cu and alkaline earth metal cation Mg. Divalent transition metal cations increase the cycling stability at high voltage (4.6V) besides divalent alkaline earth metal cation provides structural stability.

The present invention increases the capacity and provides good structural as well as cycling stability at high voltages (4.6V) due to mixed dopant effects of divalent Mg and Cu ions. The dopants increase the cell volume, which provides more space for lithium intercalation/deintercalation and shorter lithium diffusion path lengths. Dopants (Mg and Cu) leads to the simultaneous presence of $Co^{4+}$ and to a smaller extent of intermediate spin $Co^{3+(1s)}$ ions both contributing to enhanced conductivity.

The present material exhibits high voltage performance up to 4.6V and low capacity fade (0.22 mAhg$^{-1}$ cycle$^{-1}$). The process for the synthesis of this layered lithium cobalt oxide of the general formula $LiM_xN_yCo_{1-x-y}O_2$ requires 30 to 40 minutes and doesn't require any further calcination, but conventional process such as sol-gel and solid state methods take more than 8 hours or more. The process generally includes stoichiometric amounts of nitrates of Lithium, Copper, Magnesium and Cobalt to form a homogeneous solution and irradiated in microwave oven for 30-40 minutes.

The materials fabricated into cathodes for lithium ion secondary batteries using the known process. For the preparation of the positive electrode, (using known additive and binder materials) the active material, conductive additive and the binder in the ratio 80:10:10 are mixed to form slurry and spread over the current collector. An example of conductive additive material is acetylene black, binder is polyvinylidene fluoride and current collector is Aluminium foil. The electrochemical performance of the layered cathode material with reference to lithium counter electrode is presented in FIGS. 3 and 4.

Figure 3:
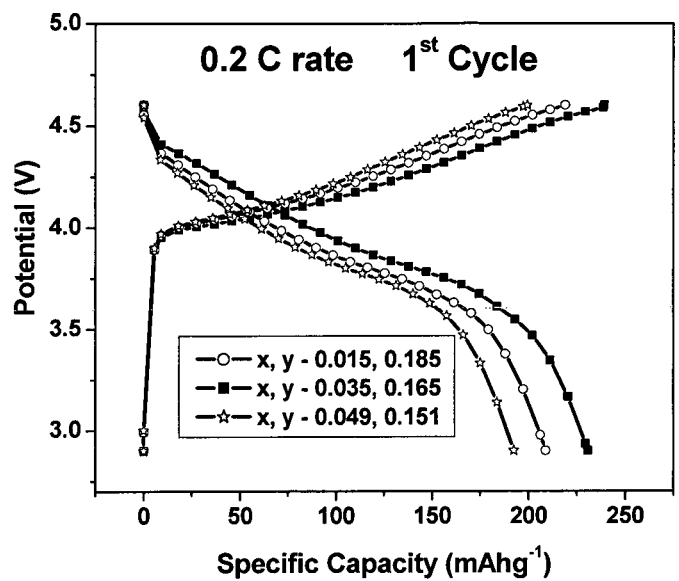
FIG. 3 shows the initial charge and discharge curves of $LiMg_{0.015}Cu_{0.185}Co_{0.8}O_2$, $LiMg_{0.035}Cu_{0.165}Co_{0.8}O_2$ and $LiMg_{0.049}Cu_{0.151}Co_{0.8}O_2$ positive active materials.

FIG. 3 shows the initial charge and discharge curves of $LiMg_{0.015}Cu_{0.185}Co_{0.8}O_2$, $LiMg_{0.035}Cu_{0.165}Co_{0.8}O_2$ and $LiMg_{0.049}Cu_{0.151}Co_{0.8}O_2$ positive active materials. The discharge capacities of the example 1, 2 and 3 are 208, 230 and 190 mAhg$^{-1}$ respectively. The initial discharge capacities of the divalent cation doped materials are higher compared to the currently used $LiCoO_2$ materials (~130 mAhg$^{-1}$) and other doped materials. The high capacity of these materials is due to the lithium insertion and extractions are completed at high voltage (4.6V).

Figure 4:
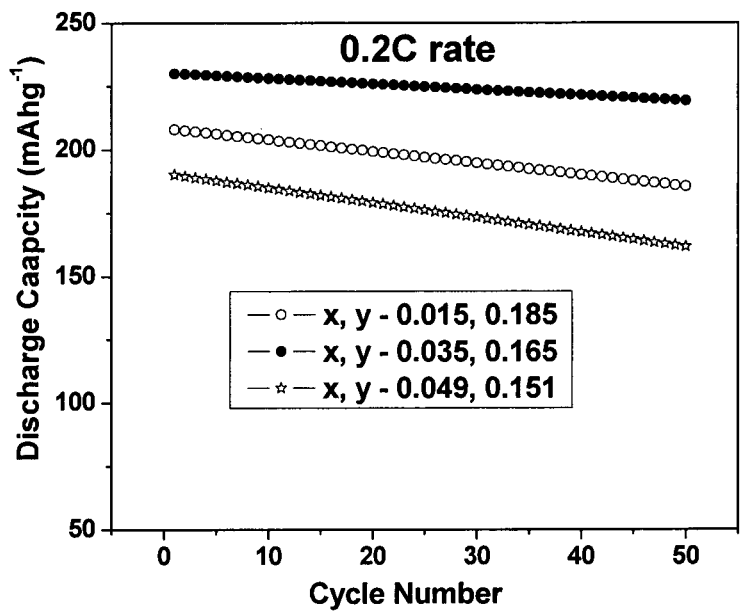
FIG. 4 represents the cycle number Vs discharge capacity curves of $LiMg_xCu_yCo_{1-x-y}O_2$ cathode material at 0.2 C rate.

FIG. 4 shows the cycling performance of the layered $LiMg_xCu_yCo_{1-x-y}O_2$ materials at 0.2 C rate over the investigated 50 cycles. The $50^{th}$ cycle discharge capacities for layered $LiMg_xCu_yCo_{1-x-y}O_2$ are 185, 219 and 161 $mAhg^{-1}$ wherein (x, y=0.015, 0.185); (x, y=0.035, 0.165) and (x, y=0.049, 0.151) samples respectively. The capacity retention after 50 cycles is 88.9, 95.2 and 84.7% respectively. The high discharge capacity and capacity retention of these layered lithium cobalt oxide material according to the present invention is due to the structural stability and conductivity enhances by the addition of the dopants. The doped electrochemically inactive Mg ions produce more $Co^{4+}$ ions for charge compensation. Due to the larger ionic radii of $Cu^{2+}$ (73 pm) and $Mg^{2+}$ (72 pm) than $Co^{3+}$ (54 pm), (pm: Pico meter) enlarges the unit cell volume, but not destroy the lattice structure. During lithium insertion/extraction, the dopants protect the layered $LiMg_xCu_yCo_{1-x-y}O_2$ positive electrode material from shrinking. This kind of pillar effects affords more space for the movement of lithium ions. Simultaneously the conductivity is enhanced and the lithium ion diffusion coefficient increases after doping.

TABLE 1

Discharge capacities and capacity retention of $LiMg_xCu_yCo_{1-x-y}O_2$ materials

| S. No | Composition x, y | Discharge Capacity (mAh/g) at 0.2 C rate | | Capacity retention (%) |
|---|---|---|---|---|
| | | $1^{st}$ cycle | $50^{th}$ cycle | |
| 1 | 0.015, 0.185 | 208 | 185 | 88.9 |
| 2 | 0.035, 0.165 | 230 | 219 | 95.2 |
| 3 | 0.049, 0.151 | 190 | 161 | 84.7 |

Figure 5:
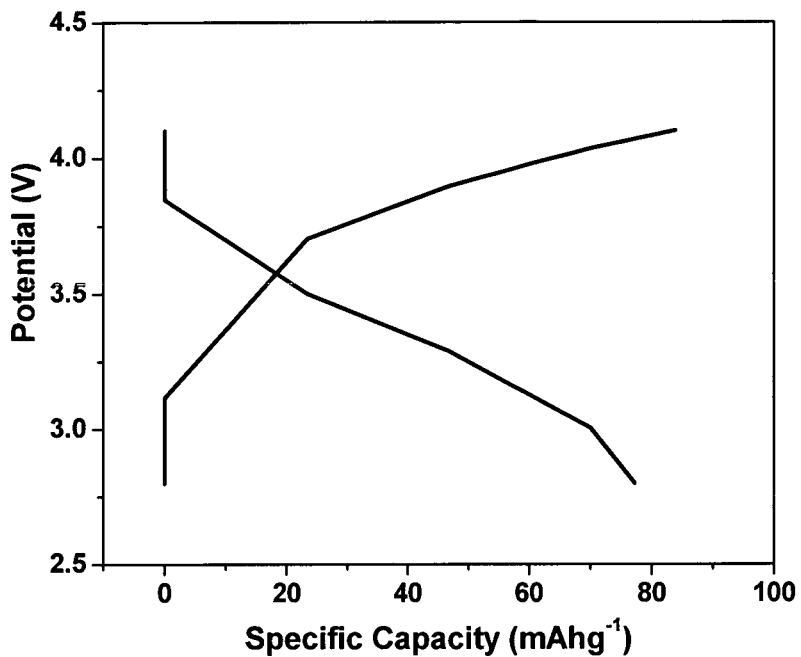
FIG. 5 represents the first charge/discharge curves of Lithium ion cell.

FIG. 5 shows the typical charge and discharge curves in the first cycle of lithium ion cell of 2016 configuration assembled using fibrous carbon paper anode and layered $LiMg_xCu_yCo_{1-x-y}O_2$ cathode. These cells were cycled between 2.9-4.1V at 1 C-rate and deliver discharge capacity of 70-90 $mAhg^{-1}$ and offer energy density of 140-300 Wh/kg.

Figure 6:
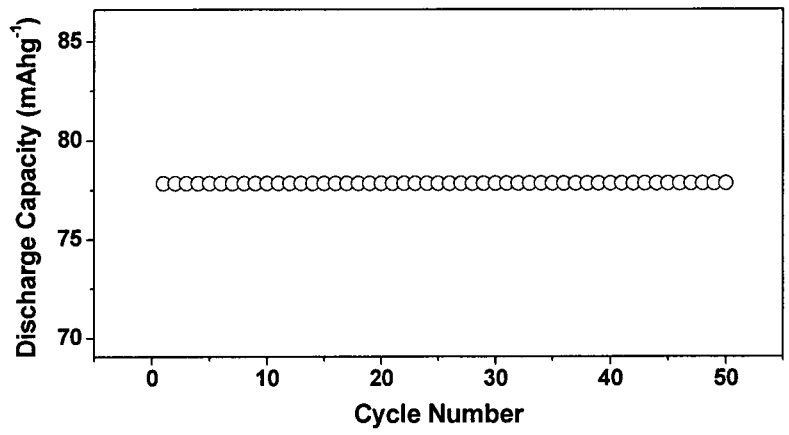
FIG. 6 represents the cycle number Vs discharge capacity curves of Lithium ion cell.

FIG. 6 shows the cycling performance of 2016 lithium ion coin cells cycled at 1 C rate for 50 cycles. The cells exhibit a stable cycling performance through out the investigated 50 cycles with a cycling efficiency of 95-98%. This excellent cycling performance is due to the $Li^+$ movement is enhanced by the suitable dopants present in the cathode material and also the nicely formed thin SEI layer on anode surface during initial charge/discharge process.

TABLE 2

| Characteristics | Cathode material | Anode material | Lithium ion battery |
|---|---|---|---|
| Discharge capacity* | 180-230 $mAhg^{-1}$ at 0.2 C rate | 200-240 $mAhg^{-1}$ at 0.2 C rate 100-140 mAh/g at 1 C rate | 70-90 $mAhg^{-1}$ at 1 C rate |
| Cyclic stability/efficiency** | 90-95% after 50 cycles when cycled between 2.9-4.6 V. | 90-97% after 50 cycles when cycled between 0.01-1.5 V. | 95-98% after 50 cycles when cycled between 2.9-4.1 V. |

*Capacity delivered per gram of active material
**Ratio of discharge to charge capacity in percentage.

EXAMPLES

The following examples are given by way of illustration of the working of the invention in actual practice and therefore should not be construed to limit the scope of the present invention.

Example 1

Preparation of Cathode Material

Preparation of $LiMg_{0.015}Cu_{0.185}Co_{0.8}O_2$

Synthesis of $LiMg_xCu_yCo_{1-x-y}O_2$ (0≤x, y≤0.2) materials were carried out by mixing stoichiometric amounts of anhydrous $LiNO_3$ (6.895 g), $Cu(NO_3)_2.3H_2O$ (4.469 g), $Mg(NO_3).6H_2O$ (0.3846 g) and $Co(NO_3)_2.4H_2O$ (23.283 g), then dissolved in 100 ml triple distilled water. The resulting metal ion solution was stirred continuously at 300 rpm for 2 hours under warm condition (100° C.). The above concentrated solution was transferred to china dish and placed at the centre of a rotating plate of microwave oven (Kenstar, India 2450 MHz, 1500 W). The solution was irradiated at full rated power (100% microwave power (2450 MHz microwave frequency) for 35 minutes. During the reaction, the chemical constituents were rapidly heated and a red glow was appeared inside the china dish throughout the reaction. After the completion of reaction the product was dried in an air oven for two hours and the resulting product was mortar ground for 2 hours in air to obtain phase pure $LiMg_xCu_yCo_{1-x-y}O_2$ and sub micron sized particles. The material was mixed with conducting material and binder to made in to slurry form and was coated over aluminium foil. It was hot pressed and 18 mm balks were punched out.

Example 2

Preparation of Cathode Material

Preparation of $LiMg_{0.035}Cu_{0.165}Co_{0.8}O_2$

Synthesis of $LiMg_xCu_yCo_{1-x-y}O_2$ (x, y≥1) materials were carried out by mixing stoichiometric amounts of anhydrous $LiNO_3$ (6.895 g), $Cu(NO_3)_2.3H_2O$ (3.9864 g), $Mg(NO_3).6H_2O$ (0.8674 g) and $Co(NO_3)_2.4H_2O$ (23.283 g), then dissolved in triple distilled water (100 ml). The resulting metal ion solution was stirred continuously (300 rpm) under warm condition (100° C.) for 2 hours. The above concentrated solution was transferred to china dish and placed at the centre of a rotating plate of microwave oven (Kenstar, India 2450 MHz, 1500 W). The solution was irradiated at full rated power (100% microwave power (2450

MHz microwave frequency)) for 35 minutes. During the reaction, the chemical constituents were rapidly heated and a red glow was appeared inside the china dish throughout the reaction. After the completion of reaction the product was dried in an air oven for 2 hours and the resulting product was mortar ground for 2 hours in air to obtain phase pure $LiMg_xCu_yCo_{1-x-y}O_2$ and sub micron sized particles. The material was mixed with conducting material and binder to made in to slurry form and was coated over aluminium foil. It was hot pressed and 18 mm balks were punched out.

Example 3

Preparation of Cathode Material

Preparation of $LiMg_{0.049}Cu_{0.151}Co_{0.8}O_2$

Synthesis of $LiMg_xCu_yCo_{1-x-y}O_2$ (x≥0.1, y≤0.1) materials were carried out by mixing stoichiometric amounts of anhydrous $LiNO_3$ (6.895 g), $Cu(NO_3)_2.3H_2O$ (3.648 g), $Mg(NO_3).6H_2O$ (1.2564 g) and $Co(NO_3)_2.4H_2O$ (23.283 g), then dissolved in 100 ml triple distilled water. The resulting metal ion solution was stirred continuously (300 rpm) for 2 hours under warm condition (100° C.). The above concentrated solution was transferred to china dish and placed at the centre of a rotating plate of microwave oven (Kenstar, India 2450 MHz, 1500 W). The solution was irradiated at full rated power (100% microwave power (2450 MHz microwave frequency)) for 30 to 40 minutes. During the reaction, the chemical constituents were rapidly heated and a red glow was appeared inside the china dish throughout the reaction. After the completion of reaction the product was dried in an air oven for 2 hours and the resulting product was mortar ground for 2 hours in air to obtain phase pure $LiMg_xCu_yCo_{1-x-y}O_2$ and sub micron sized particles. The material was mixed with conducting material and binder to made in to slurry form and was coated over aluminium foil. It was hot pressed and 18 mm balks were punched out.

Example 4

Preparation of Anode Material

The carbon paper is synthesized by well known paper making technology in which carbon fiber is impregnated with a resin. The carbon sheet anode is directly used as anode material and the sheets are punched into the size of 18 mm diameter.

Example 5

Coin Cell Assembly and Electrochemical Evaluation

Lithium ion coin cells were assembled inside argon filled glove box using the positive and the negative electrode as prepared by the aforesaid procedures and a polypropylene film separator sandwiched between these electrodes. The separator was soaked with an electrolytic solution of 1M $LiPF_6$ dissolved in a solvent EC (ethylene carbonate)/DEC (diethylene carbonate) in the ratio of 1:1. The coin cells were subjected to charge discharge cycling at C rates for 200 cycles. The experiments were repeated for concordant results and typical results are presented in FIGS. 5 and 6.

Example 6

Field Trials Using Solar Power

Some cells were charged by solar power via solar panel. The charging current was between 20-50 mA depending on sun shine intensity of the day and the discharge current was at around 30-15 mA. The cells could be chargeable in an hour and could serve to light LEDs for an hour.

ADVANTAGES OF THE INVENTION

Present invention provides suitable dual doped cathode material.
Present invention provides one step synthesis process of cathode material.
Present invention provide High capacity cathode material
Present invention provide cost effective self standing anode
Present invention provides very low irreversible capacity.
Present invention provides simplified assembling process.
Present invention provides excellent cycleability and reversibility.
Present invention provide Lithium ion coin cell capable of delivering 70-90 mAhg$^{-1}$ at 1 C rate and exhibiting excellent cycling stability of 90-95% even after 50 cycles when cycled between 2.9-4.1V.
Present invention provides lithium ion cells that are chargeable both by grid/solar power.
The Cells are suitable for powering LED lights.

We claim:

1. A process for preparation of a high voltage, high performance layered cathode material formed of dual doped Lithium cobalt oxide of a formula $LiM_xN_yCo_{1-x-y}O_2$ wherein x and y are positive values (0.01≤x, y≤0.2), M and N are dopants and M is Magnesium and N is Copper, the process comprising:
   i. dissolving nitrates of lithium, copper, magnesium and cobalt in water in a stoichiometric ratio to obtain a metal ion solution;
   ii. stirring the metal ion solution at a temperature in a range of 80-100° C. for a period of 2 to 3 hours to obtain a concentrated solution;
   iii. irradiating the concentrated solution with microwave radiation having a frequency of 1500-2450 MHz for a period of 30 to 40 minutes to obtain an irradiated solution;
   iv. drying the irradiated solution at a temperature of 100 to 120° C. for a period of 2-4 hours to obtain a dried solution;
   v. mortar grinding the dried solution to obtain a particulate material; and
   vi. mixing the particulate material with a conducting material and a binder and hot pressing the particulate material to form the high voltage, high performance layered cathode material.

2. The process as claimed in claim 1, wherein said cathode material shows high discharge capacity in a range of 160 to 230 mAh/g at 0.2 C rate up to 50 cycles.

3. The process as claimed in claim 1, wherein said cathode material showing capacity retention percentage is in a range of 84.7 to 95.2% at high rates up to 50 cycles.

4. The process as claimed in claim 1, wherein said cathode material exhibit high voltage performance up to 4.6V and low capacity fade up to 0.20 to 0.25 mAhg$^{-1}$cycle$^{-1}$.

5. A process for preparation of a phase pure high voltage, high performance layered cathode material by microwave heating method and said process comprising:
  i. mixing salts of lithium, copper, magnesium and cobalt in a weight ratio of 1:0.6:0.05:3.3 to 1:0.5:0.2:3.3 to obtain a mixture;
  ii. dissolving the mixture as obtained in step (i) in water in a ratio ranging between 1:1 to 1.5:2.0 to obtain a metal ion solution;
  iii. stirring the metal ion solution as obtained in step (ii) continuously with a rate of 300 to 450 rpm at a temperature of 80-100° C. for a period of 2 to 3 hours to obtain a concentrated solution;
  iv. transferring the concentrated solution as obtained in step (iii) to a vessel comprising a china dish or a silica crucible and placing the vessel at a center of a rotating plate of a microwave oven;
  v. irradiating the vessel containing the concentrated solution as obtained in step (iv) with 100% power and 1500-2450 MHz microwave frequency for a period of 30 to 40 minutes to obtain an irradiated solution;
  vi. drying the irradiated solution as obtained in step (v) in an air oven at a temperature in a range of 100 to 120° C. for a period of 2-4 hours to obtain a dried solution;
  vii. mortar grinding the dried solution as obtained in step (vi) for a period of 2 to 4 hrs in air to obtain the phase pure high voltage, high performance layered cathode material formed of dual doped Lithium cobalt oxide of a formula $LiM_xN_yCo_{1-x-y}O_2$ wherein x and y are positive values ($0.01 \leq x$, $y \leq 0.2$), M and N are dopants and M is Magnesium and N is Copper.

6. The process as claimed in claim 5, wherein said process is carried out without involving further calcinations after step vi.

7. A Lithium Ion Battery comprising a cathode material and an anode material wherein the cathode material is formed of dual doped Lithium cobalt oxide of a formula $LiM_xN_yCo_{1-x-y}O_2$ wherein x and y are positive values ($0.01 \leq x$, $y \leq 0.2$) and M and N are dopants and M is Magnesium and N is Copper, and the anode material comprises a self standing sheet of carbon paper.

8. The battery as claimed in claim 7, wherein the carbon paper is a micro fiber textured carbon sheet having a porosity of at least 70%.

9. The battery as claimed in claim 7, wherein said anode material exhibits a discharge capacity in a range of 100-140 mAh/g and 200-240 mAh/g at 1 C and 0.2 C rate respectively for a first cycle.

10. The battery as claimed in claim 7, wherein said anode material exhibits a cycling stability in a range of 90-97% at 0.2 and 1 C rates after 100 cycles when cycled between 0.01-1.5V.

11. The battery as claimed in claim 7, wherein said anode material provides very low irreversible capacity in a range of <5-7 mAh/g.

12. The battery as claimed in claim 7, wherein said lithium ion battery exhibits a cycling stability in a range of 95-98% after 200 cycles when cycled between 2.9-4.1 V.

13. The battery as claimed in claim 7, wherein said lithium ion battery exhibits a discharge capacity in a range of 70-90 mAh/g at 1 C rate for a first cycle.

14. The battery as claimed in claim 7, wherein said battery exhibits reversibility in a range of 95-98% at high rate.

15. The battery as claimed in claim 7, wherein said battery exhibits an energy output in a range of 140-300 Wh/kg.

16. The battery as claimed in claim 7, wherein said battery is useful as a source of power for LED lighting.

17. The battery as claimed in claim 7, wherein said battery is chargeable via a solar panel and chargeable in an hour and able to serve to light LEDs for an hour.

18. The battery as claimed in claim 7, wherein $x > 0.01$.

19. The battery as claimed in claim 7, wherein x is at least 0.015.

20. The process as claimed in claim 1, wherein $x > 0.01$.

21. The process as claimed in claim 1, wherein x is at least 0.015.

22. A high voltage, high performance layered cathode material formed of dual doped Lithium cobalt oxide of a formula $LiM_xN_yCo_{1-x-y}O_2$ wherein x and y are positive values ($0.01 \leq x$, $y \leq 0.2$), M and N are dopants, and M is Magnesium and N is Copper, wherein said dopants provide high conductivity, high discharge capacity, structural stability and cycling stability at a voltage up to 4.6V.

23. The cathode material as claimed in claim 22, wherein the cathode material is formed by a process comprising:
  i. dissolving nitrates of lithium, copper, magnesium and cobalt in water in a stoichiometric ratio to obtain a metal ion solution;
  ii. stirring the metal ion solution at a temperature in a range of 80-100° C. for a period of 2 to 3 hours to obtain a concentrated solution;
  iii. irradiating the concentrated solution with microwave radiation having a frequency of 1500-2450 MHz for a period of 30 to 40 minutes to obtain an irradiated solution;
  iv. drying the irradiated solution at a temperature of 100 to 120° C. for a period of 2-4 hours to obtain a dried solution;
  v. mortar grinding the dried solution to obtain a particulate material; and
  vi. mixing the particulate material with a conducting material and a binder and hot pressing the particulate material to form the high voltage, high performance layered cathode material.

* * * * *